(12) United States Patent
Buck

(10) Patent No.: US 11,184,161 B2
(45) Date of Patent: Nov. 23, 2021

(54) METHOD AND DEVICES FOR VERIFYING AUTHORIZATION OF AN ELECTRONIC DEVICE

(71) Applicant: LEGIC Identsystems AG, Wetzikon (CH)

(72) Inventor: Martin Buck, Zug (CH)

(73) Assignee: LEGIC Identsystems AG, Wetzikon (CH)

( * ) Notice: Subject to any disclaimer, the term of this patent is extended or adjusted under 35 U.S.C. 154(b) by 147 days.

(21) Appl. No.: 16/631,509

(22) PCT Filed: Jul. 17, 2018

(86) PCT No.: PCT/EP2018/069344
§ 371 (c)(1),
(2) Date: Jan. 16, 2020

(87) PCT Pub. No.: WO2019/016181
PCT Pub. Date: Jan. 24, 2019

(65) Prior Publication Data
US 2020/0177375 A1 Jun. 4, 2020

(30) Foreign Application Priority Data
Jul. 18, 2017 (CH) .................................. 00936/17

(51) Int. Cl.
*H04L 29/06* (2006.01)
*H04L 9/08* (2006.01)
*H04L 9/14* (2006.01)

(52) U.S. Cl.
CPC ............ *H04L 9/0847* (2013.01); *H04L 9/088* (2013.01); *H04L 9/0822* (2013.01);
(Continued)

(58) Field of Classification Search
CPC ..... H04L 9/0891; H04L 9/14; H04L 63/0435; H04L 9/0836; H04L 9/0847; H04L 9/088; H04L 9/0822; H04L 9/0861; H04L 9/083
See application file for complete search history.

(56) References Cited

U.S. PATENT DOCUMENTS 6,735,313 B1 *  5/2004  Bleichenbacher ........................ H04N 21/4623 380/241
7,043,024 B1 *  5/2006  Dinsmore ............. H04L 9/0836 380/278

(Continued)

OTHER PUBLICATIONS

Sep. 17, 2018—(PCT/EP) International Search Report—App 2018/069344.
(Continued)

*Primary Examiner* — Mohammad A Siddiqi
(74) *Attorney, Agent, or Firm* — Banner & Witcoff, Ltd.

(57) ABSTRACT

For verifying authorization associated with a first electronic device by a second electronic device, using symmetric key encryption, the second electronic device receives from the first electronic device encrypted data and metadata with a key space identifier and positional information. The key space identifier defines a cryptographic key hierarchy and the positional information defines in the cryptographic key hierarchy the cryptographic key used to generate the encrypted data. The second electronic device derives the cryptographic key by way of a one-way function from cryptographic keys stored in the second electronic device, using the key space identifier and the positional information received from the first electronic device. The second electronic device decrypts the encrypted data, using the derived cryptographic key, for verifying the authorization associated with the first electronic device.

20 Claims, 6 Drawing Sheets

(52) U.S. Cl.
CPC .......... *H04L 9/0836* (2013.01); *H04L 9/0861* (2013.01); *H04L 9/0891* (2013.01); *H04L 9/14* (2013.01); *H04L 63/0435* (2013.01); *H04L 9/083* (2013.01)

(56) References Cited

U.S. PATENT DOCUMENTS

| | | | |
|---|---|---|---|
| 7,698,551 B2* | 4/2010 | Lotspiech | H04L 9/0836 713/163 |
| 8,892,865 B1 | 11/2014 | Roth et al. | |
| 10,044,503 B1* | 8/2018 | Roth | H04L 9/14 |
| 10,366,631 B2* | 7/2019 | Furukawa | H04L 9/0618 |

OTHER PUBLICATIONS

Wang, Weichao; Li, Zhiwei; Owens, Rodney; and Bhargava, Bharat, "Secure and Efficient Access to Outsourced Data," Proceedings of the 2009 ACM Workshop on Cloud Computing Security, ACM, US, (Nov. 13, 2009), pp. 55-66.

* cited by examiner

METHOD AND DEVICES FOR VERIFYING AUTHORIZATION OF AN ELECTRONIC DEVICE

CROSS-REFERENCE TO RELATED APPLICATIONS

The present application is a U.S. National Phase filing of International Application No. PCT/EP2018/069344, filed on Jul. 17, 2018, and claiming priority to Switzerland Patent Application No. 00936/17 filed Jul. 18, 2017. The present application claims priority to and the benefit of all the above-identified applications, which are all incorporated by reference herein in their entireties.

FIELD OF THE TECHNOLOGY

The present disclosure relates to a method and devices for verifying authorization of an electronic device. Specifically, the present disclosure relates to a method and devices for verifying authorization associated with an electronic device, using symmetric key encryption.

BACKGROUND

In symmetric key encryption, the same cryptographic key is used for both encryption and decryption of data exchanged between the communicating devices. The cryptographic key is thus a secret shared between the communicating devices. The fact that the communicating devices must all have access to the secret cryptographic key is considered a drawback of symmetric key encryption—if just one of the devices is compromised, communication between all respective devices is no longer secure.

EP 2424154 describes an encryption processing system implementing a hierarchical predicate encryption scheme. According to EP 2424154, a key generation device (root) generates secret keys for devices of lower level users by using a master secret key. The secret keys are transferred from the key generation device to the respective devices of the lower level users. A lower level key, generated by the upper level device from a higher level key, has more restricted capabilities than the higher level key.

EP 2667538 describes a hierarchical identity-based encryption system which includes a setup device and a plurality of second devices forming a tree-type hierarchical structure. The setup device forms the root of the hierarchical structure and the second devices form different levels of hierarchies. The setup device 200 generates a public key which is commonly used by each of the second devices and identity-based secret keys for each of the second devices of a first or second level below the root. A second device decrypts encrypted data using a public key and its own secret key. A second device further generates secret keys for the further second devices at its lower (child) hierarchy level using its own secret key and the user-identity associated with the child second device. The hierarchical asymmetric encryption system can be implemented correspondingly in hierarchical organizations where upper hierarchical levels in the organization have the right to generate and distribute secret keys for the devices of the members in their respective lower hierarchical levels in the organization. The secret key of any second electronic device must be transferred from a setup device or a higher level second electronic device. If such a transfer is compromised the respective secret key and any secret keys generated from said respective secret key are compromised.

U.S. Pat. No. 8,892,865 describes systems and methods for authentication which generate keys from secret credentials shared between authenticating parties and authenticators. Generation of the keys may involve utilizing specialized information in the form of parameters that are used to specialize keys. Keys and/or information derived from keys held by multiple authorities may be used to generate other keys such that signatures requiring such keys and/or information can be verified without access to the keys. Keys may also be derived to form a hierarchy of keys that are distributed such that a key holder's ability to decrypt data depends on the key's position in the hierarchy relative to the position of a key used to encrypt the data. Key hierarchies may also be used to distribute key sets to content processing devices to enable the devices to decrypt content such that sources or potential sources of unauthorized content are identifiable from the decrypted content.

SUMMARY

Aspects of this disclosure provide a method and devices for verifying authorization of or associated with an electronic device, using symmetric key encryption. In particular, aspects of the present disclosure provide a method and devices for verifying authorization of an electronic device, using symmetric key encryption with reduced necessity of transferring secret keys.

According to the present disclosure, these may be achieved through the features of the independent claims. In addition, further advantageous embodiments follow from the dependent claims and the description.

According to the present disclosure, the above-mentioned aspects may be achieved in that for verifying authorization associated with a first electronic device by a second electronic device, using symmetric key encryption, a first data message is received at the second electronic device from the first electronic device. The first data message includes first encrypted data and first metadata. The first metadata includes a first key space identifier. The first key space identifier defines a first cryptographic key hierarchy, or a subset of the first cryptographic key hierarchy, which includes a first cryptographic key used to generate the first encrypted data, and positional information of the first cryptographic key of the first cryptographic key hierarchy. In the cryptographic key hierarchy, a lower level cryptographic key, being positioned in a lower level in the cryptographic key hierarchy than a higher level cryptographic key, is derived by way of a one-way function from the higher level cryptographic key and positional information which defines a position of the lower level cryptographic key in the cryptographic key hierarchy. A circuit of the second electronic device selects a second cryptographic key from a plurality of secret cryptographic keys stored in the second electronic device, using the first key space identifier received from the first electronic device. The circuit of the second electronic device derives the first cryptographic key by way of the one-way function from the second cryptographic key and positional information received from the first electronic device. The circuit of the second electronic device decrypts the first encrypted data, using the first cryptographic key, for verifying the authorization associated with the first electronic device.

Using the stored secret cryptographic key and the received positional information, the second electronic device is enabled to derive and determine the cryptographic key that the first electronic device requests to use for secured communication using symmetric key encryption. With just one secret cryptographic key stored in each electronic device, hierarchical key management is made possible for a plurality of electronic devices, where hierarchically higher electronic devices (having "ancestor" cryptographic keys higher up in the cryptographic key hierarchy) may dynamically and flexibly derive the cryptographic keys used by their hierarchically lower electronic devices (having respective "children" cryptographic keys lower in the cryptographic key hierarchy) for symmetric key encryption.

If the first cryptographic key is more than one level lower in the cryptographic key hierarchy than the second cryptographic key, the circuit of the second electronic device derives any intermediary cryptographic key on the direct path in the cryptographic key hierarchy from the second cryptographic key to the first cryptographic key. In other words, the circuit of the second electronic device derives the first cryptographic key by applying the one-way function to the second cryptographic key stored in the second electronic device and to any intermediary cryptographic key, on a direct path in the cryptographic key hierarchy from the second cryptographic key to the first cryptographic key.

In an embodiment, the second electronic device receives from the first electronic device a second data message. The second data message includes second encrypted data and second metadata. The second metadata includes a second key space identifier. The second key space identifier defines a second cryptographic key hierarchy, or a subset of the second cryptographic key hierarchy, which includes a third cryptographic key used to generate the second encrypted data, and positional information of the third cryptographic key of the second cryptographic key hierarchy. The circuit of the second electronic device selects a fourth cryptographic key from the plurality of secret cryptographic keys stored in the second electronic device, using the second key space identifier received from the first electronic device. The circuit of the second electronic device derives the third cryptographic key by way of the one-way function from the fourth cryptographic key and the positional information received from the first electronic device in the second data message. The circuit of the second electronic device derives the first cryptographic key by way of the one-way function from the second cryptographic key, using the positional information received from the first electronic device in the second data message. The circuit of the second electronic device produces first authorization data by decrypting the first encrypted data using the first cryptographic key. The circuit of the second electronic device produces second authorization data by decrypting the second encrypted data, using the third cryptographic key. The circuit of the second electronic device verifies the authorization associated with the first electronic device, using the first authorization data and the second authorization data.

Transmitting first and second authorization data encrypted in separate data messages to the electronic device, and ensuring that the cryptographic keys, for decrypting the encrypted data in the two data messages, are derived from higher level cryptographic keys using the same positional information received in the second data message, make it possible to tie authorization of the electronic device to two different sets of authorization data which may be distributed to electronic devices at different points in time and possibly by different authorization entities, using cryptographic keys from different cryptographic key hierarchies. Access rights may be transmitted once (static) with first authentication data, but granting those access rights may be conditional and depend on valid confirmations transmitted subsequently at later points in time, e.g. periodically or as needed, e.g. after a breach.

In an embodiment, decrypting the first encrypted data produces access rights encrypted in the first encrypted data; decrypting the second encrypted data produces time-dependent data encrypted in the second encrypted data; and the circuit of the second electronic device verifies the authorization associated with the first electronic device using the access rights and the time-dependent data.

Using time-dependent data as second authorization data in the second encrypted data makes it possible to make access rights in the first encrypted data conditional and dependent on the course of time. Without a second data message, which includes encrypted second authorization data with applicable time-dependent data, e.g. an up-to-date time stamp or correct value of an incremental counter, authorization of the electronic device cannot be verified and the access rights previously transmitted with the first data message will not be granted. Time-dependent, time-limited, and temporary access rights can be implemented and distributed efficiently, without having to distribute/transmit repeatedly a variety of different sets of access rights to a plurality of access control terminals, for example.

In an embodiment, in case of the positional information received in the second data message differing from the positional information received in the first data message, the first encrypted data cannot be successfully decrypted by the second electronic device using the first cryptographic key derived with the positional information received in the second data message, and the second electronic device does not positively verify the authorization associated with the first electronic device.

Using the positional information received in the second data message for deriving the first cryptographic key, required for decrypting the first encrypted data included in the first data message, ensures that the first encrypted data cannot be decrypted in case the positional information included in the second data message differs from the positional information included in the first data message. Consequently, new access rights can be distributed to authorized electronic devices using a first cryptographic key derived with positional information equal to the positional information used for deriving the third cryptographic key for encrypting the second authorization data with the time-dependent data.

In an embodiment, positional information of the second cryptographic key (and/or fourth cryptographic key, if applicable) is stored in the second electronic device. The circuit of the second electronic device derives the first cryptographic key (and/or the third cryptographic key, if applicable) by way of the one-way function from the second cryptographic key (or the fourth cryptographic key, respectively) stored in the second electronic device, the positional information of the second cryptographic key (or the fourth cryptographic key, respectively), and the positional information received from the first electronic device. In an embodiment, the positional information received from the first electronic device indicates a relative position of the first cryptographic key in the cryptographic key hierarchy with respect to a higher level cryptographic key, e.g. relative to the position of the second cryptographic key (or the fourth cryptographic key, respectively), in the cryptographic key hierarchy.

In an embodiment, the circuit of the first electronic device encrypts data using the first cryptographic key. The first electronic device transfers to the second electronic device the data message including the encrypted data and the metadata. The circuit of the second electronic device derives the first cryptographic key by way of the one-way function from the second cryptographic key, stored in the second electronic device, using the metadata included in the data message. The circuit of the second electronic device decrypts the encrypted data included in the data message, using the first cryptographic key.

In a further embodiment, the circuit of the first electronic device encrypts authentication data using the first cryptographic key. The first electronic device transfers to the second electronic device the data message including the encrypted authentication data and the metadata. The circuit of the second electronic device derives the first cryptographic key by way of the one-way function from the second cryptographic key, stored in the second electronic device, using the metadata included in the data message. The circuit of the second electronic device decrypts the encrypted authentication data included in the data message, using the first cryptographic key. The circuit of the second electronic device encrypts authentication data using the first cryptographic key. The authentication data encrypted by the second electronic device is transferred from the second electronic device to the first electronic device. The circuit of the first electronic device decrypts and verifies the encrypted authentication data received from the second electronic device, using the first cryptographic key.

In an embodiment, the cryptographic key hierarchy is configured as a tree structure and the positional information defines a node in the tree structure. Each node in the tree structure represents a cryptographic key. A root node in the tree structure represents a master cryptographic key. Nodes in the tree structure at one level below the root node represent cryptographic keys derived by way of the one-way function from the master cryptographic key. A child node at a lower level in the tree structure represents a cryptographic key derived by way of the one-way function from the cryptographic key represented by a respective parent node of the child node in the tree structure.

In addition to the method of verifying authorization associated with a first electronic device by a second electronic device, using symmetric key encryption, the present disclosure also relates to an electronic device for communicating securely with another electronic device, using symmetric encryption. The electronic device comprises a circuit configured to perform the steps of: transferring to the other electronic device a first data message, the first data message including first encrypted data and first metadata, the first metadata including a first key space identifier, the first key space identifier defining a first cryptographic key hierarchy or a subset of the first cryptographic key hierarchy which includes a first cryptographic key used to generate the first encrypted data, and positional information of the first cryptographic key of the first cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy, the first metadata enabling the other electronic device to select a second cryptographic key from a plurality of secret cryptographic keys stored in the other electronic device, using the first key space identifier received from the electronic device, to derive the first cryptographic key by way of the one-way function from the second cryptographic key and the positional information included in the metadata, and to decrypt the first encrypted data, using the first cryptographic key, for verifying the authorization associated with the electronic device.

In an embodiment, the circuit of the electronic device is further configured to transfer to the other electronic device a second data message, the second data message including second encrypted data and second metadata, the second metadata including a second key space identifier, the second key space identifier defining a second cryptographic key hierarchy or a subset of the second cryptographic key hierarchy which includes a third cryptographic key used to generate the second encrypted data, and positional information of the third cryptographic key of the second cryptographic key hierarchy, enabling the other electronic device to select a fourth cryptographic key from the plurality of secret cryptographic keys stored in the other electronic device, using the second key space identifier received from the electronic device, to derive the third cryptographic key by way of the one-way function from the fourth cryptographic key and the positional information received from the electronic device in the second data message, to derive the first cryptographic key by way of the one-way function from the second cryptographic key, using the positional information received from the electronic device in the second data message, to produce first authorization data by decrypting the first encrypted data, using the first cryptographic key, to produce second authorization data by decrypting the second encrypted data using the third cryptographic key, and to verify the authorization associated with the electronic device, using the first authorization data and the second authorization data.

In an embodiment, decrypting the first encrypted data produces access rights encrypted in the first encrypted data, decrypting the second encrypted data produces time-dependent data encrypted in the second encrypted data; and the other electronic device is enabled to verify the authorization associated with the electronic device using the access rights and the time-dependent data.

In an embodiment, in case of the positional information transferred in the second data message differing from the positional information transferred in the first data message, the other electronic device is not enabled to successfully decrypt the first encrypted data using the first cryptographic key derived with the positional information transferred in the second data message, and the other electronic device is not enabled to positively verify the authorization associated with the electronic device.

In a further embodiment, the circuit of the electronic device is further configured to encrypt data using the first cryptographic key; to transfer to the other electronic device the data message including the encrypted data and the metadata, enabling the other electronic device to derive the first cryptographic key, using the metadata included in the data message, and to decrypt the encrypted data included in the data message, using the first cryptographic key.

In an embodiment, the circuit of the electronic device is further configured to encrypt authentication data using the first cryptographic key; to transfer to the other electronic device the data message including the encrypted authentication data and the metadata, enabling the other electronic device to derive the first cryptographic key, using the metadata included in the data message, and to decrypt the encrypted authentication data included in the data message, using the first cryptographic key; to receive from the other electronic device encrypted authentication data; and to decrypt and verify the encrypted authentication data received from the other electronic device using the first cryptographic key.

In addition to the method of verifying authorization associated with a first electronic device by a second electronic device, and the electronic device for communicating securely between electronic devices using symmetric key encryption, the present disclosure also relates to a computer program product comprising a non-transient computer-readable medium having stored thereon computer program code configured to control a circuit of a first electronic device, for communicating securely with a second electronic device using symmetric encryption, such that the first electronic device performs the steps of: transferring to the second electronic device a first data message, the first data message including first encrypted data and first metadata, the first metadata including a first key space identifier, the first key space identifier defining a first cryptographic key hierarchy or a subset of the first cryptographic key hierarchy which includes a first cryptographic key used to generate the first encrypted data, and positional information of the first cryptographic key of the first cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy, the first metadata enabling the second electronic device to select a second cryptographic key from a plurality of secret cryptographic keys stored in the second electronic device, using the first key space identifier received from the first electronic device, to derive the first cryptographic key by way of the one-way function from the second cryptographic key and the positional information included in the metadata, and to decrypt the first encrypted data, using the first cryptographic key, for verifying the authorization associated with the electronic device.

In an embodiment, the non-transient computer-readable medium has stored thereon further computer program code configured to control the circuit of the first electronic device, such that the first electronic device performs the steps of: transferring to the other electronic device a second data message, the second data message including second encrypted data and second metadata, the second metadata including a second key space identifier, the second key space identifier defining a second cryptographic key hierarchy or a subset of the second cryptographic key hierarchy which includes a third cryptographic key used to generate the second encrypted data, and positional information of the third cryptographic key of the second cryptographic key hierarchy, enabling the second electronic device to select a fourth cryptographic key from the plurality of secret cryptographic keys stored in the second electronic device, using the second key space identifier received from the electronic device, to derive the third cryptographic key by way of the one-way function from the fourth cryptographic key and the positional information received from the first electronic device in the second data message, to derive the first cryptographic key by way of the one-way function from the second cryptographic key, using the positional information received from the first electronic device in the second data message, to produce first authorization data by decrypting the first encrypted data, using the first cryptographic key, to produce second authorization data by decrypting the second encrypted data using the third cryptographic key, and to verify the authorization associated with the first electronic device, using the first authorization data and the second authorization data.

In addition to the method of verifying authorization associated with a first electronic device by a second electronic device, and the electronic device for communicating securely between electronic devices using symmetric encryption, the present disclosure also relates to a further electronic device for verifying authorization associated with another electronic device, using symmetric encryption. The further electronic device comprises a circuit configured to perform the steps of: receiving from the other electronic device a first data message, the first data message including first encrypted data and first metadata, the first metadata including a first key space identifier, the first key space identifier defining a first cryptographic key hierarchy or a subset of the first cryptographic key hierarchy which includes a first cryptographic key used to generate the first encrypted data, and positional information of the first cryptographic key of the first cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy; selecting a second cryptographic key from a plurality of secret cryptographic keys stored in the electronic device, using the first key space identifier received from the other electronic device; deriving the first cryptographic key by way of the one-way function from the second cryptographic key and the positional information received from the other electronic device; and decrypting the first encrypted data, using the first cryptographic key, for verifying the authorization associated with the other electronic device.

In an embodiment, the circuit of the electronic device is further configured to receive from the other electronic device a second data message, the second data message including second encrypted data and second metadata, the second metadata including a second key space identifier, the second key space identifier defining a second cryptographic key hierarchy or a subset of the second cryptographic key hierarchy which includes a third cryptographic key used to generate the second encrypted data, and positional information of the third cryptographic key of the second cryptographic key hierarchy; select a fourth cryptographic key from the plurality of secret cryptographic keys stored in the electronic device, using the second key space identifier received from the other electronic device; derive the third cryptographic key by way of the one-way function from the fourth cryptographic key and the positional information received from the other electronic device in the second data message; deriving the first cryptographic key by way of the one-way function from the second cryptographic key, using the positional information received from the other electronic device in the second data message; produce first authorization data by decrypting the first encrypted data, using the first cryptographic key; produce second authorization data by decrypting the second encrypted data using the third cryptographic key; and verify the authorization associated with the other electronic device, using the first authorization data and the second authorization data.

In an embodiment, decrypting the first encrypted data produces access rights encrypted in the first encrypted data, decrypting the second encrypted data produces time-dependent data encrypted in the second encrypted data; and the circuit of the electronic device is configured to verify the authorization associated with the other electronic device using the access rights and the time-dependent data.

In an embodiment, in case of the positional information received in the second data message differing from the positional information received in the first data message, the first encrypted data cannot be successfully decrypted by the circuit of the electronic device using the first cryptographic key derived with the positional information received in the second data message, and the circuit of the electronic device does not positively verify the authorization associated with the other electronic device.

In an embodiment, the circuit of the electronic device is further configured to store in the electronic device positional information of the second cryptographic key (and/or the fourth cryptographic key, if applicable); and to derive the first cryptographic key (and/or the third cryptographic key, if applicable) by way of the one-way function from the second cryptographic key (or the fourth cryptographic key, respectively) stored in the electronic device, the positional information of the second cryptographic key (or the fourth cryptographic key, respectively) stored in the electronic device, and the positional information received from the other electronic device.

In an embodiment, the circuit of the electronic device is further configured to receive in the data message from the other electronic device encrypted data and metadata; to derive the first cryptographic key by way of the one-way function from the second cryptographic key, stored in the second electronic device, using the metadata included in the data message; and to decrypt the encrypted data included in the data message, using the first cryptographic key.

In a further embodiment, the circuit of the electronic device is further configured to receive in the data message from the other electronic device encrypted authentication data and metadata; to derive the first cryptographic key by way of the one-way function from the second cryptographic key, stored in the second electronic device, using the metadata included in the data message; to decrypt the encrypted authentication data included in the data message, using the first cryptographic key; to encrypt authentication data using the first cryptographic key; and to transfer the encrypted authentication data to the other electronic device, enabling the other electronic device to decrypt and verify the authentication data received from the electronic device using the first cryptographic key.

In addition to the method of verifying authorization associated with a first electronic device by a second electronic device, and the electronic devices for communicating securely with other electronic devices using symmetric encryption, the present disclosure also relates to a computer program product comprising a non-transient computer-readable medium having stored thereon computer program code configured to control a circuit of a second electronic device, for verifying authorization associated with a first electronic device using symmetric encryption, such that the second electronic device performs the steps of: receiving from the first electronic device a first data message, the first data message including first encrypted data and first metadata, the first metadata including a first key space identifier, the first key space identifier defining a first cryptographic key hierarchy or a subset of the first cryptographic key hierarchy which includes a first cryptographic key used to generate the first encrypted data, and positional information of the first cryptographic key of the first cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy; selecting a second cryptographic key from a plurality of secret cryptographic keys stored in the second electronic device, using the first key space identifier received from the first electronic device; deriving the first cryptographic key by way of the one-way function from the second cryptographic key and the positional information received from the first electronic device; and decrypting the first encrypted data, using the first cryptographic key, for verifying the authorization associated with the first electronic device.

In an embodiment, the non-transient computer-readable medium has stored thereon further computer program code configured to control the circuit of the second electronic device, such that the second electronic device performs the steps of: receiving from the first electronic device a second data message, the second data message including second encrypted data and second metadata, the second metadata including a second key space identifier, the second key space identifier defining a second cryptographic key hierarchy or a subset of the second cryptographic key hierarchy which includes a third cryptographic key used to generate the second encrypted data, and positional information of the third cryptographic key of the second cryptographic key hierarchy; selecting a fourth cryptographic key from the plurality of secret cryptographic keys stored in the second electronic device, using the second key space identifier received from the first electronic device; deriving the third cryptographic key by way of the one-way function from the fourth cryptographic key and the positional information received from the first electronic device in the second data message; deriving the first cryptographic key by way of the one-way function from the second cryptographic key, using the positional information received from the first electronic device in the second data message; producing first authorization data by decrypting the first encrypted data, using the first cryptographic key; producing second authorization data by decrypting the second encrypted data using the third cryptographic key; and verifying the authorization associated with the first electronic device, using the first authorization data and the second authorization data.

BRIEF DESCRIPTION OF THE DRAWINGS

The present disclosure will be explained in more detail, by way of example, with reference to the drawings in which.

DETAILED DESCRIPTION

Figure 1:
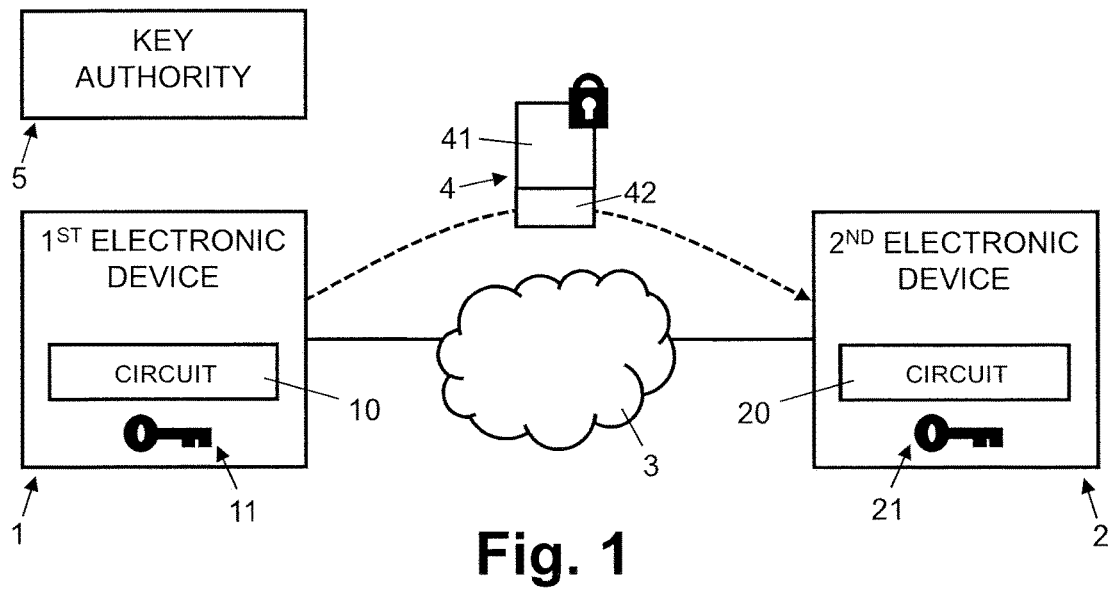
FIG. 1 shows a block diagram illustrating schematically a first electronic device and a second electronic device communicating data securely via a communication link, using symmetric key encryption according to the present disclosure.

In FIGS. 1-4, 6, 7, reference numeral 1 refers to a first electronic device and reference numeral 2 refers to a second electronic device. The first electronic device 1 and the second electronic device 2 are operable electronic devices, each comprising an electronic circuit 10, 20. One skilled in the art will understand that the circuits 10, 20 are programmable processors or other configurable electronic logic units, which are programmed or configured to execute various functions and steps, as described later in more detail. The first electronic device 1 and the second electronic device 2 are configured to communicate with each other via a communication link 3. Depending on the type or embodiment of the first electronic device 1 and the second electronic device 2 the communication link is a wired or contact-based communication link, or a wireless communication link, e.g. a close or short range communication link, such as an RFID (Radio Frequency IDentifier), NFC (Near Field Communication), BLE (Bluetooth Low Energy) or the like, a medium range communication link, such as WLAN (Wireless Local Area Network) or BT (Bluetooth), or a long distance communication link, such as GSM (Global System for Mobile Communication) or UMTS (Universal Mobile Telephone System) or the like. Accordingly and depending on the application and/or embodiment, the first electronic device 1 and the second electronic device 2 are implemented as fixed or mobile communication devices, e.g. a personal computer (desktop, laptop, notebook), a tablet computing device, a smart phone (mobile radio phone), a smart watch, a transponder, a smart card (chip card) or electronic dongle, etc.

Figure 3:
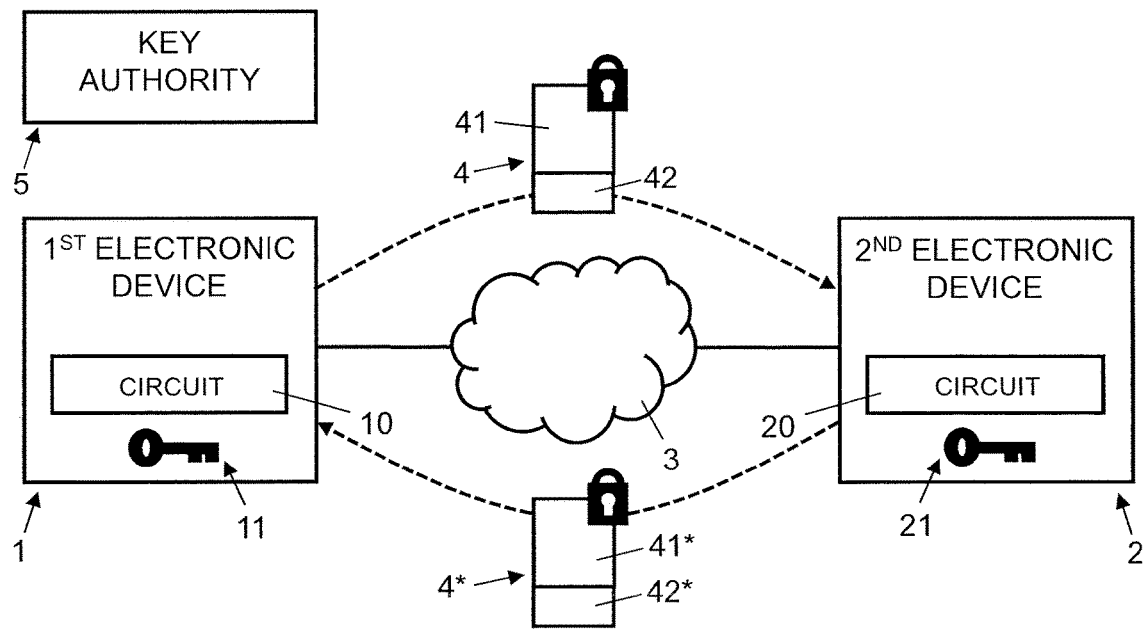
FIG. 3 shows a block diagram illustrating schematically a first electronic device and a second electronic device communicating securely via a communication link, by exchanging and verifying authentication data, using symmetric key encryption according to the present disclosure.
Figure 6:
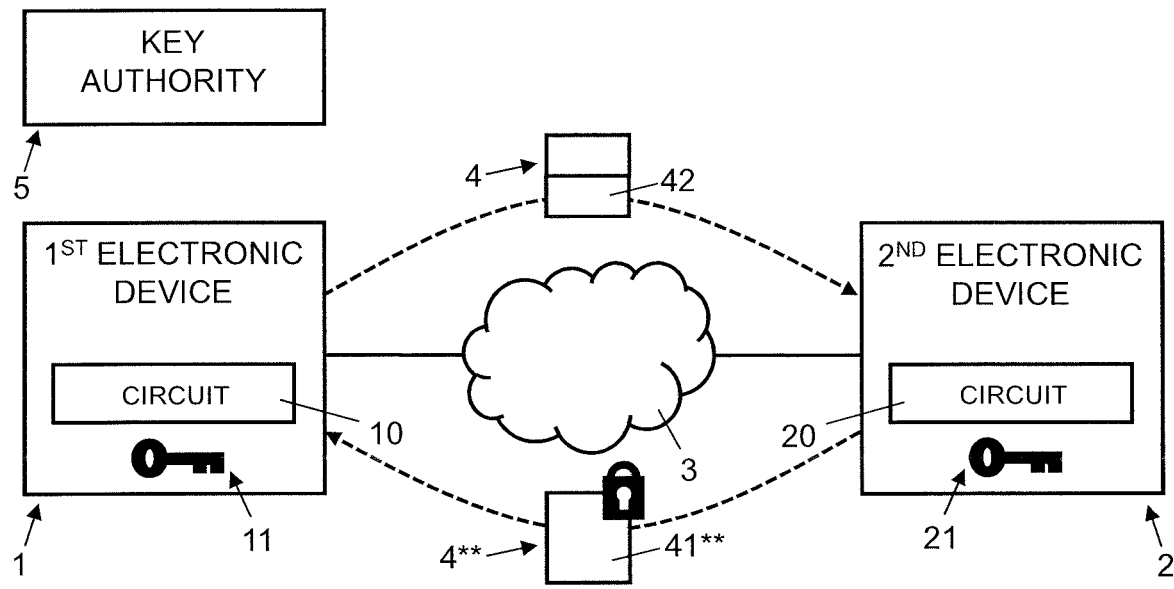
FIG. 6 shows a block diagram illustrating schematically a first electronic device and a second electronic device communicating data securely via a communication link, using symmetric key encryption and optionally exchanging and verifying authentication data according to the present disclosure.

As illustrated schematically in FIGS. 1, 3 and 6, the first electronic device 1 comprises a secret cryptographic key 11 stored securely in the first electronic device 1. The second electronic device 2 comprises a secret cryptographic key 21 stored securely in the second electronic device 2. The secret cryptographic keys 11, 21 stored in the electronic devices 1, 2 are generated by a key authority 5. The secret cryptographic keys 11, 21 are stored in the electronic devices 1, 2 in a secured fashion, e.g. by the key authority 5 in a secured process at manufacturing or configuration time of the electronic devices 1, 2. The key authority 5 comprises one or more computers with one or more processors configured to generate secret cryptographic keys of a cryptographic key hierarchy 6.

Figure 5:
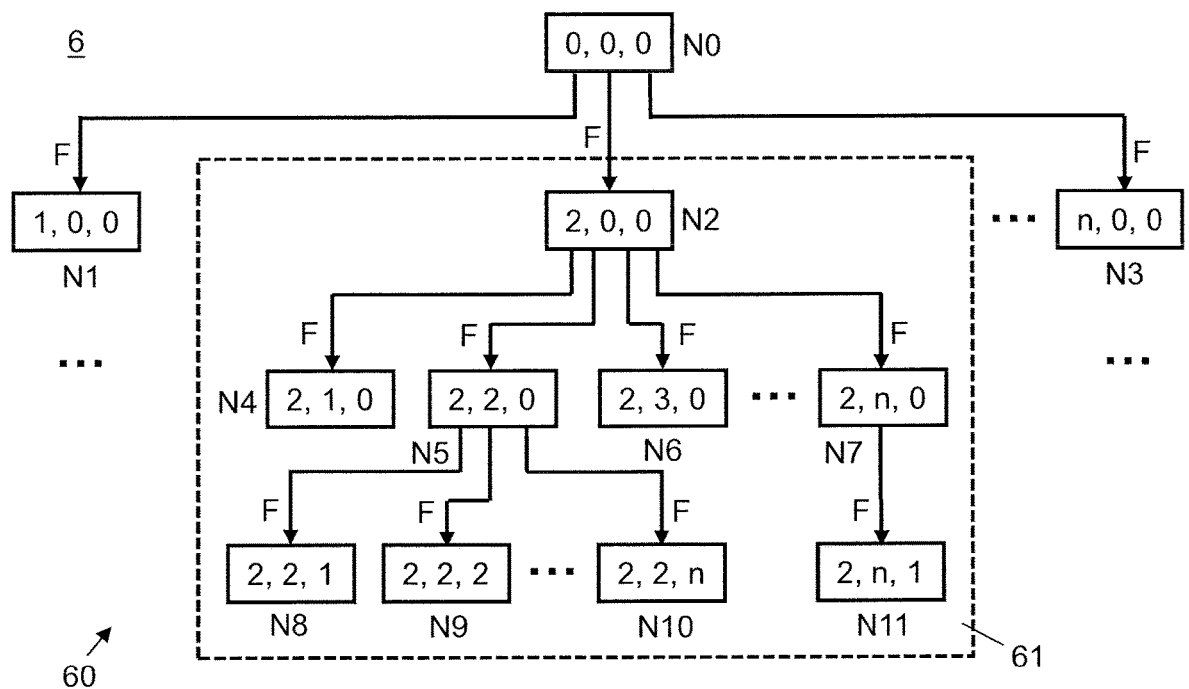
FIG. 5 shows an example of cryptographic key hierarchy configured as a tree structure having a root node and child nodes below the root node, the root node representing a master cryptographic key and the child nodes representing cryptographic keys derived from the master cryptographic key using a one-way function according to the present disclosure.

As illustrated schematically in FIG. 5, lower levels keys at a lower level of the cryptographic key hierarchy 6 are derived by way of a cryptographic one-way function F from upper level keys at a higher level of the cryptographic key hierarchy 6. A one-way function F is a function that is easy to compute for every input, but requires high computational complexity in the inverse direction, i.e. for computing the required input to the function for and from a given output of the function. Examples of one-way functions include AES128 or AES256 Advanced Encryption Standard (AES), as defined by the National Institute of Standards and Technology (NIST).

In the example of a hierarchical tree structure 60 shown in FIG. 5, the root node N0 of the tree structure 60 represents a master cryptographic key. All cryptographic keys at the next lower level from the root node N0, represented by child nodes N1, N2, ..., N3 in the tree structure 60, are derived by the one-way-function F from the master key represented by the root mode N0. Likewise, the cryptographic keys at the next lower level from node N2, represented by child nodes N4, N5, N6, ..., N7 in the tree structure 60, are derived by the one-way-function F from the cryptographic key represented by their respective parent node N2; and the cryptographic keys at the next lower level from node N5, represented by child nodes N8, N9, ..., N10 in the tree structure 60, are derived by the one-way-function F from the cryptographic key represented by their respective parent node N5. As illustrated in FIG. 5, each node and respective cryptographic key of cryptographic key hierarchy 6 is defined by its position (or relative position) in the hierarchical tree structure 60. In the example illustrated in FIG. 5, the hierarchical tree structure 60 has three hierarchical levels below the root node N0 and the position of a node can be defined by three indices. For example, the position of the root node is defined by index values [0,0,0], and the child nodes can be defined by index values [L1,L2,L3] where L1 indicates the position of the node N0, N2, ..., N3 at the first level below the root node N0, L2 indicates the position of the node N4, N5, N6, ..., N7 at the second level below the root node NO, and L3 indicates the position of the node N8, N9, N10, ..., N11 at the third level below the root node N0. The cryptographic key for any node in the hierarchical tree structure 60 can be derived (computed) from the master key of the root node N0 or from the respective parent node or another respective ancestor node using the one-way function F. To derive (compute) the cryptographic key $K_{[L1,L2,L3]}$ for a specific node at level L and position [L1,L2,L3] in the hierarchical tree structure 60, the one-way function F is applied to the upper level cryptographic key $K_{L-1}$ represented by the respective parent node and the position (or relative position) PosL of the specific node at its level L, $K_{[L1, L2, L3]} = F\{K_{L-1}; PosL\{[L1,L2,L3]\}\}$, i.e. the position PosL at level L among its siblings, i.e. among the children, at level L, of its respective parent node, at the upper level L−1. For example, the cryptographic key $K_{[2,3,0]}$ for node N6 at position [2,3,0] in the hierarchical tree structure 60 is computed by applying the one-way function F to the upper level cryptographic key $K_{[2,0,0]}$ represented by parent node N2 and the position PosL{[2,3,0]}=3 of node N6 at its level L2, $K_{[2,3,0]}=F\{K_{[2,0,0]};3\}$.

Figure 8:
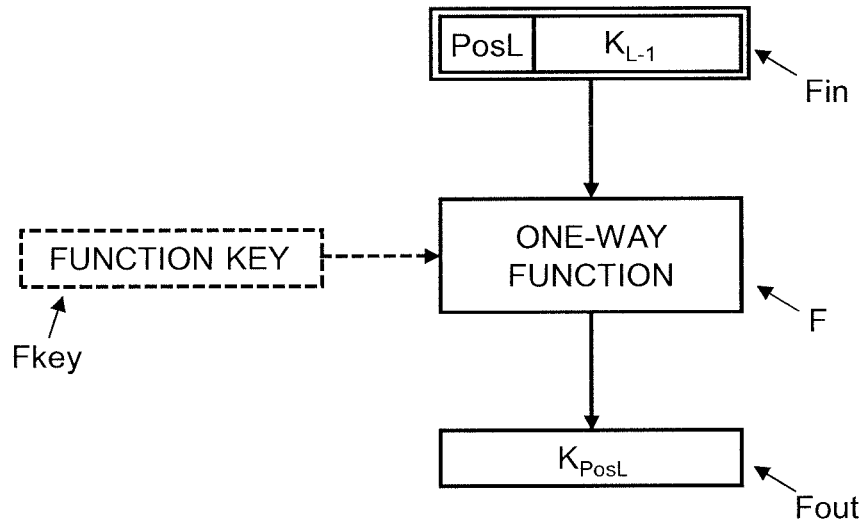
FIG. 8 shows a block diagram illustrating schematically a cryptographic one-way function for deriving a lower level key of a cryptographic key hierarchy from an upper level key at a higher level of the cryptographic key hierarchy according to the present disclosure.

As illustrated in FIG. 8, the one-way function F computes from a function input Fin a function output Fout. The function input includes the position PosL of the lower level cryptographic key $K_{PosL}$, to be derived at the lower level L, and the upper level parent cryptographic key $K_{L-1}$. The position PosL is a bit string that defines the position of the lower level cryptographic key $K_{PosL}$ at the lower level L; its value does not necessarily need to indicate the position numerically, but merely needs to determine unambiguously the position at the respective level L. For example, the position PosL and the upper level parent cryptographic key $K_{L-1}$ from a 128 or 256 bit string data input block Fin for the AES128 or AES256 function, respectively. Depending on the particular one-way function F, a function key Fkey, stored securely in the electronic devices 1, 2, is required for computing the lower level cryptographic key $K_{PosL}$, for example, a 128 bits or 256 bits AES key for the AES128 or AES256 function, respectively. The function output Fout represents the derived lower level cryptographic key $K_{PosL}$, for example, a 128 bits or 256 bits AES key from the AES128 or AES256 function, respectively. In an alternative embodiment, the function input Fin of the one-way function F is kept at a fixed value (stored securely in the electronic devices 1, 2) and the combination of the position PosL of the lower level cryptographic key $K_{PosL}$, to be derived at the lower level L, and the upper level parent cryptographic key $K_{L-1}$ are used as the function key Fkey of the one-way function F.

Depending on the number of levels between the accessible ancestor cryptographic key and the (relative) position of the cryptographic key to be derived, the cryptographic key is derived by computing the one-way function F once, if the accessible ancestor cryptographic key is represented by the direct parent node, or several times, if the accessible ancestor cryptographic key is higher up in the cryptographic key hierarchy 6 and the cryptographic key has to be derived through (down) several levels of the hierarchical tree structure 60. In other words, lower level keys, at a lower level of the cryptographic key hierarchy 6, are derived by applying the cryptographic one-way function F to their upper level keys, at a higher level of the cryptographic key hierarchy 6, to compute the cryptographic key(s) for any node on the direct path from the known or accessible cryptographic key of the ancestor node, up to and including the cryptographic key for the target node defined by the positional information. Thus, the one-way function is applied to the known or accessible cryptographic key and to any intermediary cryptographic key, on the direct path in the cryptographic key hierarchy 6 from the ancestor node with the known or accessible cryptographic key to the target node defined by the positional information.

Lower level cryptographic keys can only be derived from higher level cryptographic keys represented by (direct) ancestor nodes (parent nodes, grandparent nodes, great grandparent nodes, etc.), they cannot be derived from higher level cryptographic keys represented by other (non-ancestor) nodes (uncle nodes) on separate (parallel) branches in the hierarchical tree structure 60. For example, the cryptographic key represented by node N11 can only be derived by cryptographic keys represented by its ancestor nodes N7, N2, and N0; it cannot be derived, however, from cryptographic keys represented by other non-ancestor nodes N4, N5, or N6 (uncle nodes) on separate branches. One skilled in the art will understand that the number of levels and the number of nodes in a level of the hierarchical tree structure 60 or cryptographic key hierarchy 6, respectively, can be set, e.g. by the key authority 5 depending on the requirements of the particular application or scenario.

FIG. 6 illustrates a scenario where metadata 42 with positional information is transferred in a data message 4 from the first electronic device 1 (or its circuit 10, respectively) via communication link 3 to the second electronic device 2. The positional information relates to the position of the cryptographic key used or requested to be used by the first electronic device 1. For example, if the first electronic device 1 uses or requests the cryptographic key represented by node N8 in the hierarchical tree structure 60 of the cryptographic key hierarchy 6, the positional information indicates the respective position [L1, L2, L3]=[2, 2, 1] of the node N8 in the hierarchical tree structure 60. One skilled in the art will understand, that the positional information may define a cryptographic key in the cryptographic key hierarchy 6 by indicating a specific node in the hierarchical tree structure 60 or by specifying a relative position of said specific node with respect to an ancestor node. FIG. 6 further illustrates a scenario where subsequently to the transfer of the data message 4 from the first electronic device 1 to the second electronic device 2, the second electronic device 2 (or its circuit 20, respectively) optionally transfers a data message 4 to the first electronic device 1, which data message 4 includes data 41 encrypted by the electronic device 2. In an authentication process, the encrypted data 41 includes encrypted authentication data, as described later with reference to FIG. 7.

FIG. 1 illustrates a scenario where data 41 encrypted by the first electronic device 1 (or its circuit 10, respectively) is transferred in a data message 4 via communication link 3 to the second electronic device 2. In addition to the encrypted data 41, the data message 4 further comprises metadata with positional information of the cryptographic key used by the first electronic device 1 for encrypting the data.

FIG. 3 illustrates a further scenario where subsequently to the transfer of the data message 4 from the first electronic device 1 to the second electronic device 2, the second electronic device 2 (or its circuit 20, respectively) transfers a data message 4* to the first electronic device 1, which data message 4* includes data 41* encrypted by the electronic device 2 and, optionally, meta data 42* with positional information of the cryptographic key used by the second electronic device 2 for encrypting the data. In an application where the data includes authentication data, FIG. 3 actually illustrates an authentication process as described later with reference to FIG. 4.

Figure 2:
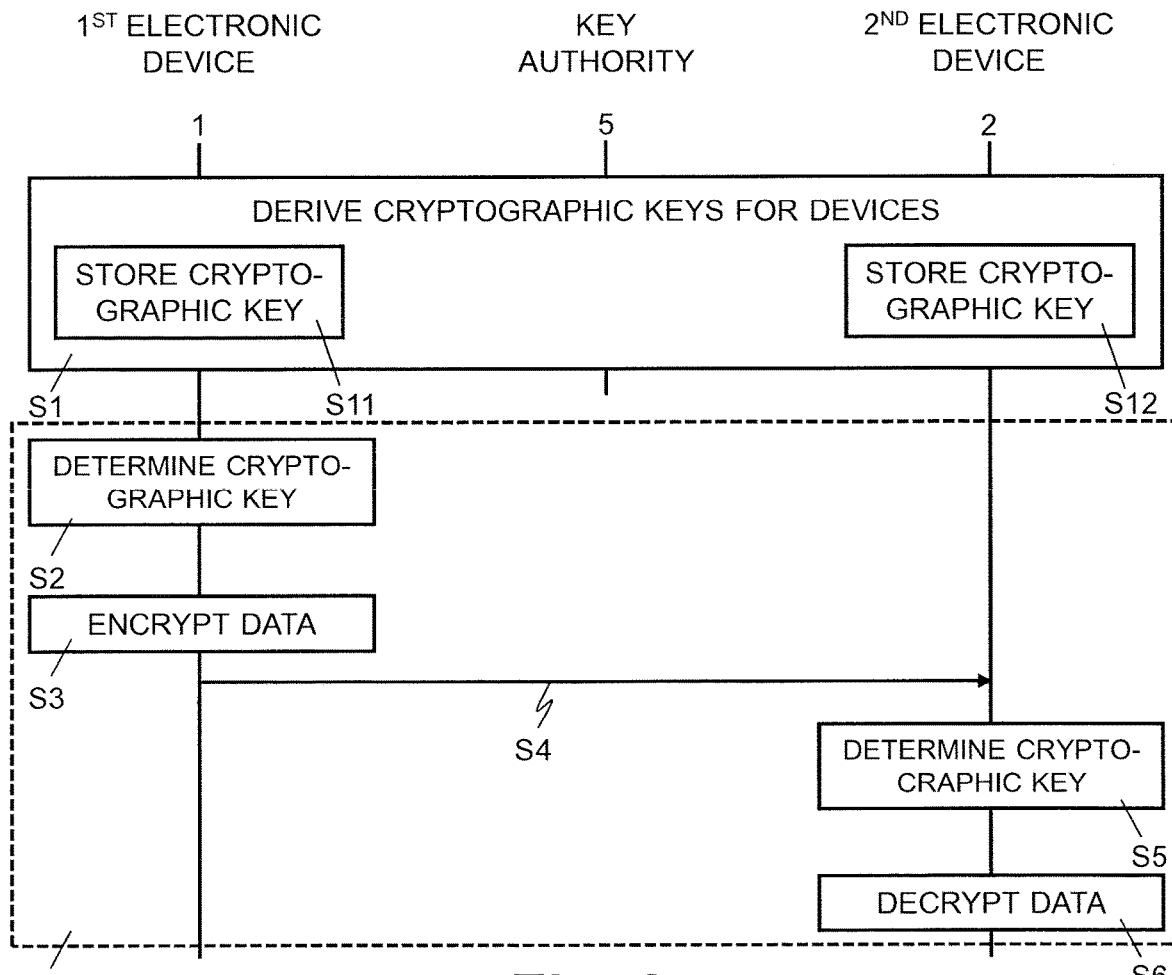
FIG. 2 shows a flow diagram illustrating an exemplary sequence of steps for communicating data securely between a first electronic device and a second electronic device, using symmetric key encryption according to the present disclosure.
Figure 4:
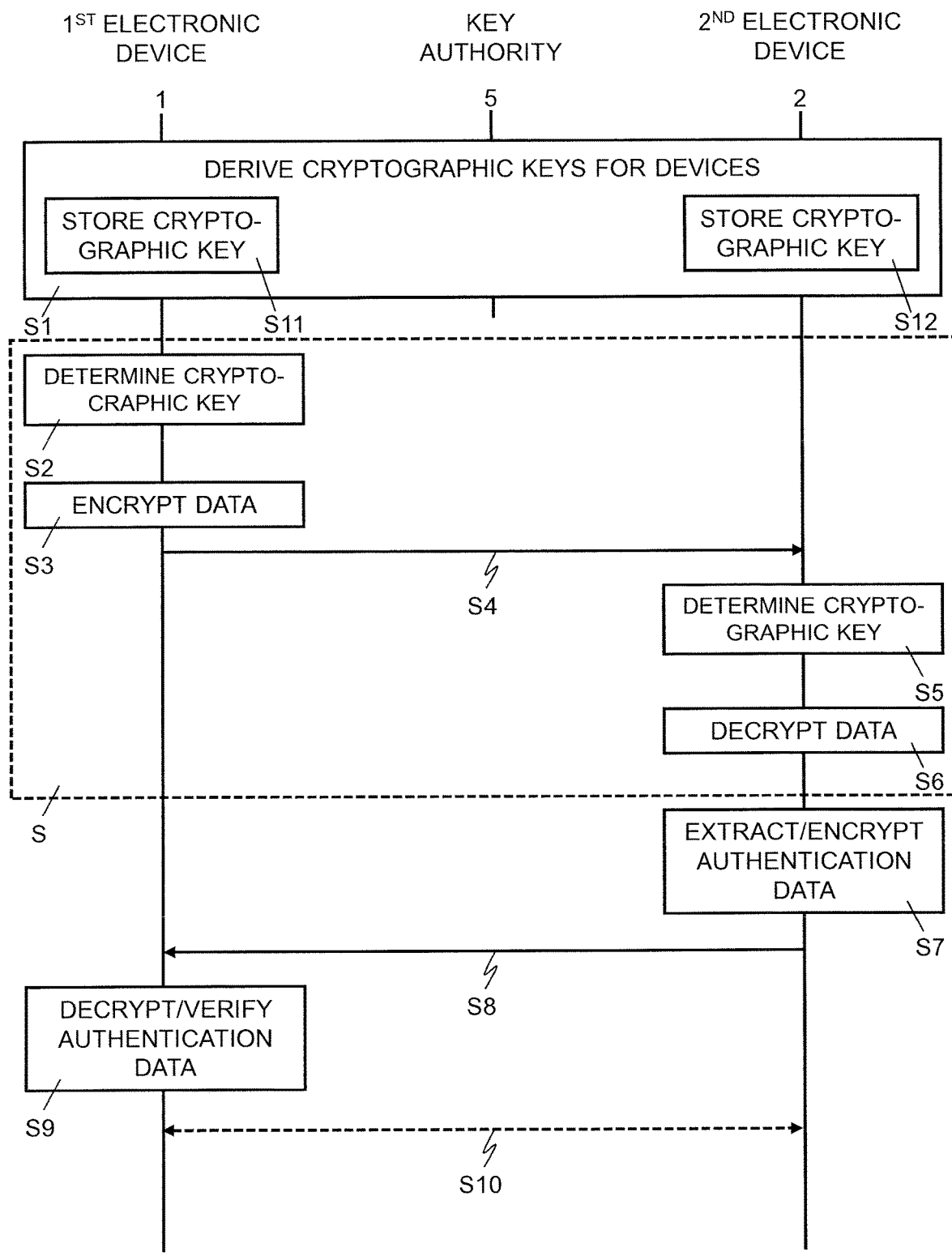
FIG. 4 shows a flow diagram illustrating an exemplary sequence of steps for communicating securely between a first electronic device and a second electronic device, by exchanging and verifying authentication data, using symmetric key encryption according to the present disclosure.
Figure 7:
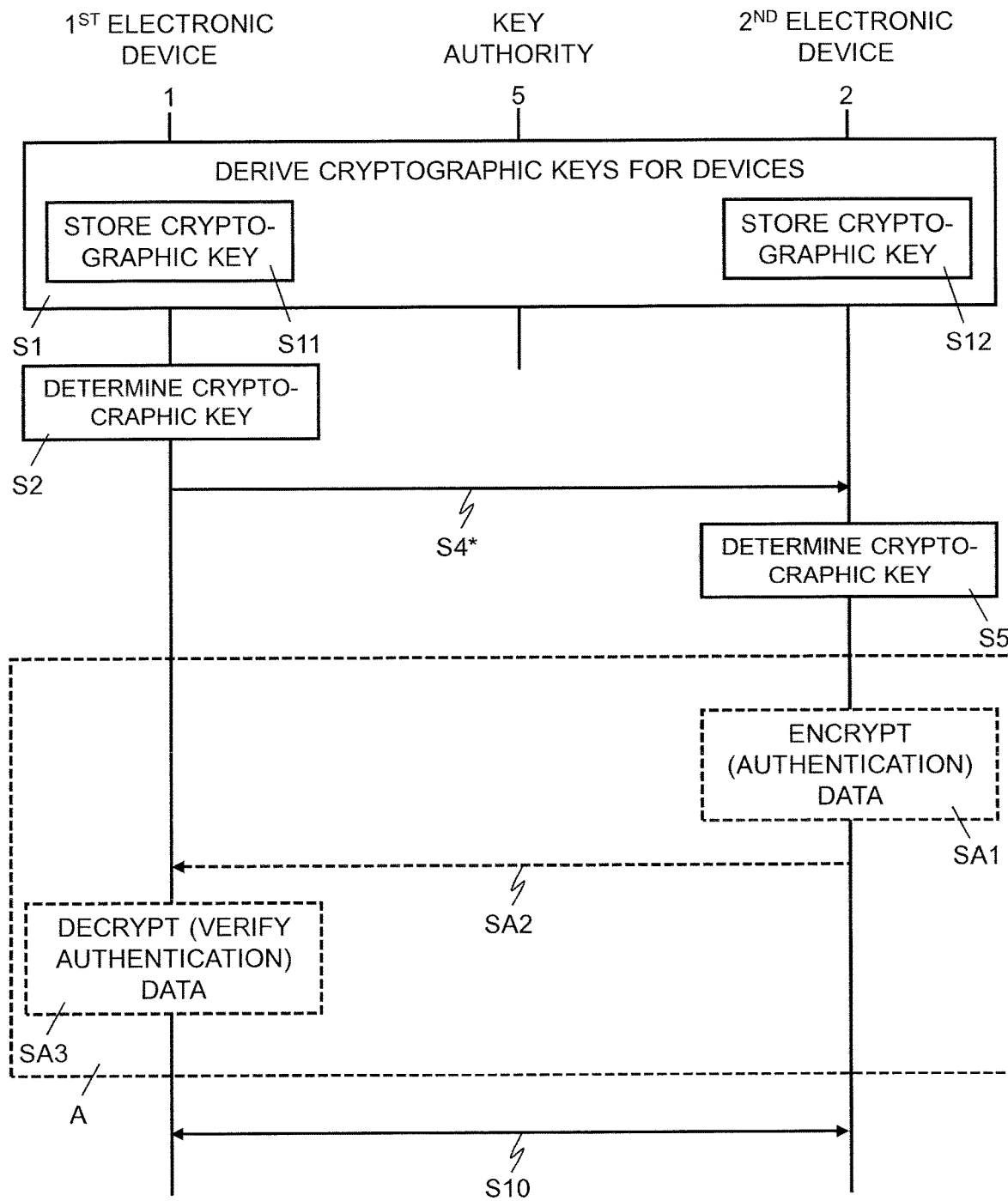
FIG. 7 shows a flow diagram illustrating an exemplary sequence of steps for communicating securely between a first electronic device and a second electronic device, using symmetric key encryption and optionally exchanging and verifying authentication data according to the present disclosure.

In the following paragraphs, described with reference to FIGS. 2, 4 and 7 are possible sequences of steps performed by the key authority 5 and the circuits 10, 20 of the electronic devices 1, 2 for communicating securely between the electronic devices 1, 2 using symmetric key encryption.

Figure 9:
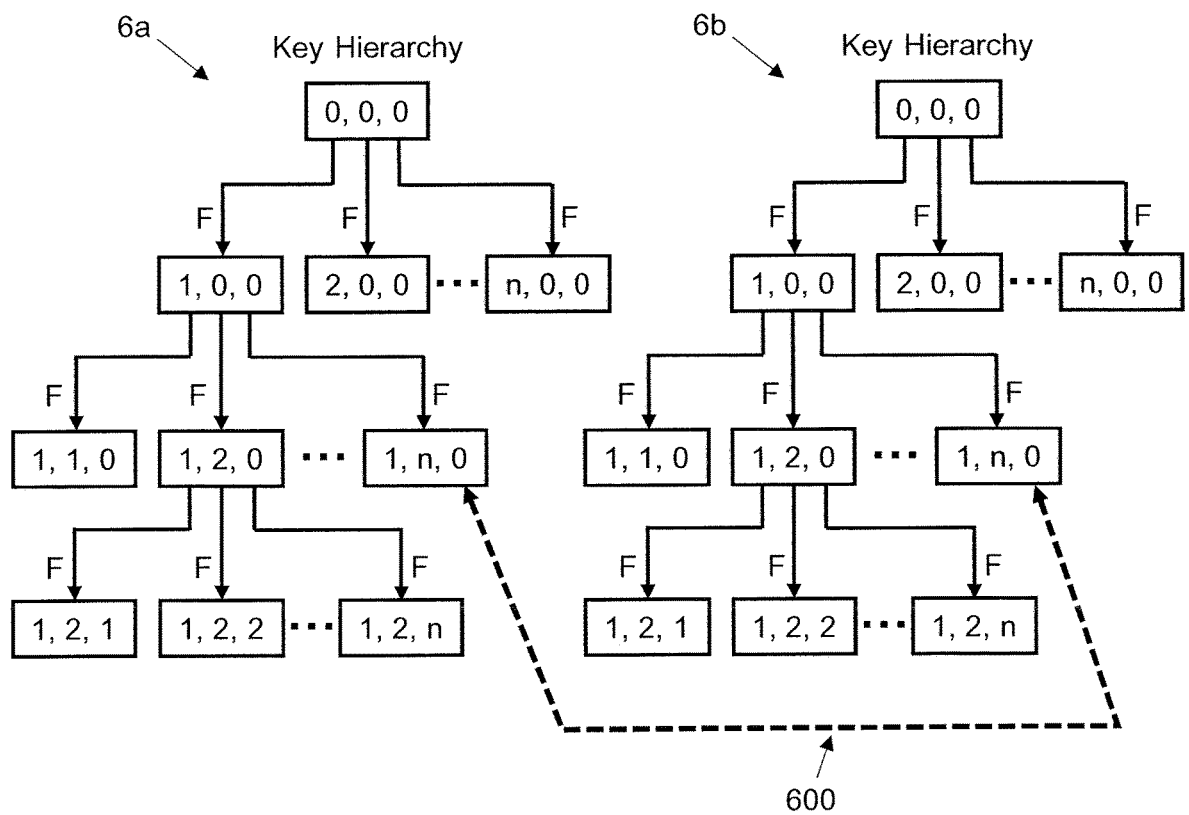
FIG. 9 shows an example of two different cryptographic key hierarchies configured as tree structures, each having a different root node and child nodes below the root node, two child nodes being indicated as linked for having the same position in their respective tree structure according to the present disclosure.

As illustrated in FIGS. 2, 4 and 7, in step S1, secret cryptographic keys are derived and stored in the electronic devices 1, 2. Specifically, the secret cryptographic keys 11, 21 stored in the electronic devices 1, 2 are determined from the cryptographic key hierarchy 6, e.g. depending on the level of authorization and/or rights to be given to the respective electronic devices 1, 2. The higher up in the cryptographic key hierarchy 6 the cryptographic key 11, 21 is selected, the more cryptographic keys of lower levels in the cryptographic key hierarchy 6 can be derived from the selected cryptographic keys 11, 21. In steps S11, S12, the cryptographic keys 11, 21 are stored in a secured process in the first electronic device 1 or in the second electronic device 2, e.g. during manufacturing or configuration of the electronic devices 1, 2 and/or in a restricted area, by the key authority 5 or another trusted entity. The cryptographic keys 11, 21 are stored in the electronic devices 1, 2 together with the respective metadata. The metadata of the cryptographic key includes a key space identifier which identifies (defines) the specific cryptographic key hierarchy 6 or a subset 61 of the cryptographic key hierarchy 6 from which the respective cryptographic key was selected or derived. The metadata further includes positional information which defines the (absolute or relative) position of the respective cryptographic key in the specific cryptographic key hierarchy 6 or subset 61 of the cryptographic key hierarchy 6. For example, for the cryptographic key represented by node N8 in the hierarchical tree structure 60, the key space identifier indicates the respective cryptographic key hierarchy 6 or its subset 61, and the positional information indicates the respective position [L1,L2,L3]=[2,2,1] in the hierarchical tree structure 60. FIG. 9 shows two further key hierarchies 6a, 6b, identified by their own respective key space identifiers, with a plurality of nodes representing cryptographic keys and their respective positions [L1,L2;L3] in the cryptographic key hierarchy 6a, 6b. Reference numeral 600 refers to a virtual link which indicates two different cryptographic keys, each in a different one of the two key hierarchies 6a, 6b, but at the same position [L1,L2,L3]=[1; n;0] in the respective key hierarchy 6a, 6b or hierarchical tree structure.

As illustrated in FIGS. 2, 4 and 7, in step S2, the first electronic device 1, or its circuit 10, respectively, determines the cryptographic key to be used for communicating securely with the second electronic device 2. The cryptographic key is determined, for example, depending on the type of the second electronic device 2 or the application/interaction to be performed with second electronic device 2. In essence, the circuit 10 uses the cryptographic key 11 stored in the first electronic device 1 or uses the one-way function and specific positional information to derive a lower level cryptographic key in the cryptographic key hierarchy 6 from the cryptographic key 11 stored in the first electronic device 1.

In the embodiment of FIG. 7, in step S4*, the first electronic device 1, or its circuit 10, respectively, generates and transfers via communication link 3 to the second electronic device 2 a data message 4. The data message includes metadata associated with the cryptographic key determined in step S2. The metadata 42 includes the positional information of the cryptographic key and/or the key space identifier of the specific cryptographic key hierarchy 6 or cryptographic key hierarchy subset 61 including the cryptographic key.

In step S5, the second electronic device 2 or its circuit 20, respectively, receives the data message 4 from the first electronic device 1 and determines the cryptographic key defined by the metadata 42 included in the data message 4. If there are several secret cryptographic keys 21 stored in the second electronic device 2, the circuit 20 uses the key space identifier included in the metadata 42 to determine the applicable cryptographic key hierarchy 6 or subset 61 of the cryptographic key hierarchy 6. By comparing the positional information stored in the second electronic device 2 for the secret cryptographic key 21 (of the applicable cryptographic key hierarchy 6 or subset 61) to the positional information received with the metadata for the cryptographic key used by the first electronic device 1, the circuit 20 determines whether the secret cryptographic key 21 stored in the second electronic device 2 is at a corresponding position in the cryptographic key hierarchy 6 and can thus be used for decrypting the received encrypted data 41, or whether the secret cryptographic key 21 is a suitable ancestor in the cryptographic key hierarchy 6 for deriving a cryptographic key matching the position of the cryptographic key specified by the first electronic device 1 in the cryptographic key hierarchy 6. If either of these cases is not possible, the circuit 20 rejects the data message 4 from the first electronic device 1 and/or generates an error message. Otherwise, the circuit 20 obtains the stored secret cryptographic key 21 for decrypting the encrypted data 41 or for deriving the cryptographic key specified by the first electronic device 1 by way of the one-way function F, using the positional information received in the metadata 42. For example, if the secret cryptographic key 21 stored in the second electronic device 2 corresponds to the ancestor cryptographic key represented by node N5 in the cryptographic key hierarchy 6 or subset 61, and if the positional information received from the first electronic device 1 indicates the position [L1,L2,L3]=[2,2,1] of node N8 in the hierarchical tree structure 60, the circuit 20 derives the cryptographic key represented by child node N8 from the stored secret cryptographic key 21 (represented by ancestor node N5), using the one-way function F and the positional information [L1,L2,L3]=[2,2, 1] of node N8.

Subsequently, the cryptographic key determined in step S5 is used by the second electronic device 2 or its circuit 20, respectively, for performing secured data communication with the first electronic device 1, e.g. by exchanging encrypted data using symmetric key encryption as indicated by step S10.

In FIG. 7, reference numeral A refers to a block of optional steps for executing an authentication process subsequently to performing the steps S1, S2, S4*, and S5 of FIG. 7.

In step SA1, the second electronic device 2 or its circuit 20, respectively, generates an authentication data message 4**, by encrypting authentication data using the cryptographic key determined in step S5. For example, the authentication data includes data received from the first electronic device 1, e.g. the positional information previously received with the metadata 42, and a nonce, e.g. a random number and/or a time stamp.

In step SA2, the second electronic device 2 or its circuit 20, respectively, transmits the authentication data message 4 with the encrypted (authentication) data 4 via communication link 3 to the first electronic device 1.

In step SA3, the first electronic device 1, or its circuit 10, respectively, receives the authentication data message 4 from the second electronic device 2 and decrypts the authentication data message 4 using the cryptographic key determined in step S2 to obtain the authentication data. Subsequently, the circuit 10 verifies the authentication data received, in encrypted form in the authentication message 4, from the second electronic device 2, by comparing it to the original authentication data, e.g. the positional information determined in step S2. If the original authentication data of the first electronic device 1 matches the authentication data obtained and decrypted from the authentication message 4, authenticity of the authentication data and thus the second electronic device 2 is confirmed. If that is the case, secure data communication between the electronic devices 1, 2 may be executed in step S10. Otherwise, the circuit 10 rejects the authentication data message 4** from the second electronic device 2 and/or generates an error message.

In the embodiment of FIG. 2, in step S3, the first electronic device 1, or its circuit 10, respectively, uses the cryptographic key determined in step S2 to encrypt the data to be transmitted via communication link 3 to the second electronic device 2. In case of an authentication process, the data includes authentication data, e.g. including a nonce with a time stamp and/or a random number.

In step S4, the first electronic device 1, or its circuit 10, respectively, generates and transmits via communication link 3 to the second electronic device 2 a data message 4. The data message includes the encrypted data 41 and metadata associated with the cryptographic key used to encrypt the data. The metadata 42 includes the positional information of the cryptographic key and/or the key space identifier of the specific cryptographic key hierarchy 6 or cryptographic key hierarchy subset 61 including the cryptographic key.

In step S5, as described above in connection with FIG. 7, the second electronic device 2 or its circuit 20, respectively, receives the data message 4 from the first electronic device 1 and determines a cryptographic key for decrypting the encrypted data 41 included in the data message 4.

In step S6, the second electronic device 2 or its circuit 20, respectively, uses the cryptographic key determined in step S5 to decrypt the encrypted data 41 received from the first electronic device 1.

In FIGS. 2 and 4, reference numeral S refers to a sequence of steps S2, S3, S4, S5 and S6, described above which makes it possible to securely communicate encrypted data between electronic devices 1, 2 (by changing the roles of encryption device and decryption device in both directions). The further steps S7, S8, S9, described below with reference to FIG. 4, make it possible to implement an authentication process between the electronic devices 1, 2 to establish secure and authenticated communication between the electronic devices 1, 2.

In the authentication process illustrated in FIGS. 3 and 4, the data encrypted in step S3 by the first electronic device 1, or its circuit 10, respectively, includes authentication data.

As illustrated in FIG. 4, in step S7, the second electronic device 2 or its circuit 20, respectively, extracts the authentication data from the data decrypted in step S6. In step S7, the circuit 20 uses the same cryptographic key, determined in step S5 and used in S6 to decrypt the encrypted data 41 received from the first electronic device 1, to encrypt the authentication data. The circuit 20 generates a response data message 4* which includes the encrypted authentication data 41* and optionally metadata 42*.

In step S8, the second electronic device 2 or its circuit 20, respectively, transmits the response data message 4* via communication link 3 to the first electronic device 1.

In step S9, the first electronic device 1 or its circuit 10, respectively, receives the response data message 4* from the second electronic device 2 and decrypts the encrypted authentication data 41* using the cryptographic key used previously in step S3 to encrypt the data for the second electronic device 2. Subsequently, the circuit 10 verifies the decrypted authentication data received, in encrypted form in the response data message 4*, from the second electronic device 2, by comparing it to the original authentication data, defined at the first electronic device 1 before it was encrypted and transmitted to the second electronic device 2 in steps S3 and S4, respectively. If the original authentication data of the first electronic device 1 matches the authentication data decrypted from the response data message 4* received from the second electronic device 2, authenticity of the authentication data and thus the second electronic device 2 is confirmed. If that is the case, secure data communication between the electronic devices 1, 2 may be executed in step S10. Otherwise, the circuit 10 rejects the response data message 4* from the second electronic device 2 and/or generates an error message.

In an access control application, for verifying authorization associated with a first electronic device 1 by a second electronic device 2, the first electronic device 1 transmits authorization data to the second electronic device 2 to be checked, such as to verify authorization of the first electronic device 1. For example, the first electronic device 1 is a mobile device as outlined above and the second electronic device 2 is an access control device (terminal) controlling a lock of a door or gate to control access to a building or room. Specifically, with the sequence of steps S (including steps S2, S3, S4, S5 and S6), the first electronic device 1 communicates securely in a first data message first authorization data with access rights to the second electronic device 2, using a first encryption key from a first key hierarchy 6a defined by a first key space identifier. The access rights may include entry permissions for the respective user, e.g. for specific times or time periods. One skilled in the art will understand that different types and kinds of access rights may be possible, depending on the particular access control application. In an embodiment, a key or access right authority 5 generates the first data message with the encrypted first authorization data and first metadata, including the first key space identifier and the first positional information for defining the first encryption key of the first key hierarchy 6a, by executing steps S2 and S3, and transferring the first data message to the first electronic device 1, enabling the first electronic device 1 to transmit the first data message to the second electronic device 2 in step S4. Subsequently, with a further sequence of steps S, the first electronic device 1 communicates securely in a second data message second authorization data with time-dependent data to the second electronic device 2, using a second encryption key from a second key hierarchy 6b defined by a second key space identifier. In an embodiment, the key or access right authority 5 generates the second data message with the encrypted second authorization data and second metadata, including the second key space identifier and the second positional information for defining the second encryption key of the second key hierarchy 6b, by executing a further sequence of steps S2 and S3, and transferring the second data message to the first electronic device 1, enabling the first electronic device 1 to transmit the second data message to the second electronic device 2 in step S4. As illustrated in FIG. 9, for relating the second authorization data with the time-dependent data to the first authorization data with the access rights, the first encryption key and the second encryption key are linked in that they have the same positional information in their respective key hierarchy 6a or 6b.

For verifying the authorization of the first electronic device 1, the second electronic device 2 or its circuit 20, respectively, checks whether the time-dependent data, decrypted from the encrypted data in the second data message, using the cryptographic key from the respective key hierarchy 6b and at the position [L1;L2;L3]=[1;n;0] defined in the second data message, is up to date. For example, the time-dependent data received from the first electronic device 1 must have a date and/or time value not older than a corresponding date and/or time value stored or determined in the second electronic device 2, or an incremental counter value must not be lower than an incremental counter value stored or determined in the second electronic device 2. If the received time-dependent data does not meet these requirements, it is considered outdated and the second electronic device 2 or its circuit 20, respectively, does not verify authorization of the first electronic device 1 and denies access. Otherwise, the second electronic device 2 or its circuit 20, respectively, checks the received first authorization data with access rights. However, for that purpose, the second electronic device 2 or its circuit 20, respectively, determines in the first key hierarchy 6a the cryptographic key linked to the cryptographic key from the second key hierarchy 6a used for decrypting the time-dependent data. Thus, the second electronic device 2 or its circuit 20, respectively, uses the cryptographic key in the key hierarchy 6a, identified by the key space identifier in the first data message, but at the position defined by the metadata in the second data message, used to convey the second authorization data with the time-dependent data. In other words, the same position information, received in the second data message and defining the cryptographic key in the second key hierarchy 6b for decrypting the time-dependent data, is used to determine the cryptographic key in the first key hierarchy 6a for decrypting the access rights received in the first data message. Subsequently, the second electronic device 2 or its circuit 20, respectively, checks the validity of the access rights obtained through decryption of the encrypted data of the first data message using the linked cryptographic key. For that purpose, the second electronic device 2 or its circuit 20, respectively, compares the decrypted access rights to the access rights stored or determined in the second electronic device 2, If there is a match or correspondence, the second electronic device 2 or its circuit 20, respectively, verifies positively the authorization of the first electronic device 1 and grants access; otherwise, authorization of the first electronic device 1 is not verified and access is denied.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the disclosure.

The invention claimed is:

1. A method of verifying authorization associated with a first electronic device by a second electronic device, using symmetric key encryption, the method comprising: receiving from the first electronic device at the second electronic device a first data message, the first data message including first encrypted data and first metadata, the first metadata including a first key space identifier, the first key space identifier defining a first cryptographic key hierarchy or a subset of the first cryptographic key hierarchy which includes a first cryptographic key used to generate the first encrypted data, and positional information of the first cryptographic key of the first cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy;

selecting, by a circuit of the second electronic device, a second cryptographic key from a plurality of secret cryptographic keys stored in the second electronic device, using the first key space identifier received from the first electronic device; deriving, by the circuit of the second electronic device, the first cryptographic key by way of the one-way function from the second cryptographic key and positional information received from the first electronic device; and decrypting, by the circuit of the second electronic device, the first encrypted data, using the first cryptographic key, for verifying the authorization associated with the first electronic device.

2. The method of claim 1, further comprising the second electronic device receiving from the first electronic device a second data message, the second data message including second encrypted data and second metadata, the second metadata including a second key space identifier, the second key space identifier defining a second cryptographic key hierarchy or a subset of the second cryptographic key hierarchy which includes a third cryptographic key used to generate the second encrypted data, and positional information of the third cryptographic key of the second cryptographic key hierarchy; and the circuit of the second electronic device selecting a fourth cryptographic key from the plurality of secret cryptographic keys stored in the second electronic device, using the second key space identifier received from the first electronic device; deriving the third cryptographic key by way of the one-way function from the fourth cryptographic key and the positional information received from the first electronic device in the second data message; deriving the first cryptographic key by way of the one-way function from the second cryptographic key, using the positional information received from the first electronic device in the second data message; producing first authorization data by decrypting the first encrypted data, using the first cryptographic key; producing second authorization data by decrypting the second encrypted data using the third cryptographic key; and verifying the authorization associated with the first electronic device, using the first authorization data and the second authorization data.

3. The method of claim 2, wherein decrypting the first encrypted data produces access rights encrypted in the first encrypted data, decrypting the second encrypted data produces time-dependent data encrypted in the second encrypted data; and the circuit of the second electronic device verifies the authorization associated with the first electronic device using the access rights and the time-dependent data.

4. The method of claim 2, wherein, in case of the positional information received in the second data message differing from the positional information received in the first data message, the first encrypted data cannot be successfully decrypted by the second electronic device using the first cryptographic key derived with the positional information received in the second data message, and the second electronic device does not positively verify the authorization associated with the first electronic device.

5. The method of claim 3, wherein, in case of the positional information received in the second data message differing from the positional information received in the first data message, the first encrypted data cannot be successfully decrypted by the second electronic device using the first cryptographic key derived with the positional information received in the second data message, and the second electronic device does not positively verify the authorization associated with the first electronic device.

6. The method of claim 4, further comprising storing in the second electronic device positional information of the second cryptographic key; and determining the first cryptographic key by the circuit of the second electronic device deriving the first cryptographic key by way of the one-way function from the second cryptographic key, stored in the second electronic device, the positional information of the second cryptographic key, and the positional information received from the first electronic device.

7. The method of claim 1, to further comprising storing in the second electronic device positional information of the second cryptographic key; and determining the first cryptographic key by the circuit of the second electronic device deriving the first cryptographic key by way of the one-way function from the second cryptographic key, stored in the second electronic device, the positional information of the second cryptographic key, and the positional information received from the first electronic device.

8. The method of claim 1, wherein the cryptographic key hierarchy is configured as a tree structure (60) and the positional information defines a node in the tree structure, whereby each node in the tree structure represents a cryptographic key, a root node in the tree structure represents a master cryptographic key, nodes in the tree structure at one level below the root node represent cryptographic keys derived by way of the one-way function from the master cryptographic key, and a child node at a lower level in the tree structure represents a cryptographic key derived by way of the one-way function from the cryptographic key represented by a respective parent node of the child node in the tree structure.

9. An electronic device for communicating securely with another electronic device, using symmetric encryption, the electronic device comprising a circuit configured to perform the steps of:
transferring to the other electronic device a first data message, the first data message including first encrypted data and first metadata, the first metadata including a first key space identifier, the first key space identifier defining a first cryptographic key hierarchy or a subset of the first cryptographic key hierarchy which includes a first cryptographic key used to generate the first encrypted data, and positional information of the first cryptographic key of the first cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy, the first metadata enabling the other electronic device to select a second cryptographic key from a plurality of secret cryptographic keys stored in the other electronic device, using the first key space identifier received from the electronic device, to derive the first cryptographic key by way of the one-way function from the second cryptographic key and the positional information included in the metadata, and to decrypt the first encrypted data, using the first cryptographic key, for verifying the authorization associated with the electronic device.

10. The electronic device of claim 9, wherein the circuit is further configured to transfer to the other electronic device a second data message, the second data message including second encrypted data and second metadata, the second metadata including a second key space identifier, the second key space identifier defining a second cryptographic key hierarchy or a subset of the second cryptographic key hierarchy which includes a third cryptographic key used to generate the second encrypted data, and positional information of the third cryptographic key of the second cryptographic key hierarchy, enabling the other electronic device to select a fourth cryptographic key from the plurality of secret cryptographic keys stored in the other electronic device, using the second key space identifier received from the electronic device, to derive the third cryptographic key by way of the one-way function from the fourth cryptographic key and the positional information received from the electronic device in the second data message, to derive the first cryptographic key by way of the one-way function from the second cryptographic key, using the positional information received from the electronic device in the second data message, to produce first authorization data by decrypting the first encrypted data, using the first cryptographic key, to produce second authorization data by decrypting the second encrypted data using the third cryptographic key, and to verify the authorization associated with the electronic device, using the first authorization data and the second authorization data.

11. The electronic device of claim 10, wherein decrypting the first encrypted data produces access rights encrypted in the first encrypted data, decrypting the second encrypted data produces time-dependent data encrypted in the second encrypted data; and the other electronic device is enabled to verify the authorization associated with the electronic device using the access rights and the time-dependent data.

12. The electronic device of claim 10, wherein, in case of the positional information transferred in the second data message differing from the positional information transferred in the first data message, the other electronic device is not enabled to successfully decrypt the first encrypted data using the first cryptographic key derived with the positional information transferred in the second data message, and the other electronic device is not enabled to positively verify the authorization associated with the electronic device.

13. A computer program product comprising a non-transient computer-readable medium having stored thereon computer program code configured to control a circuit of a first electronic device, for communicating securely with a second electronic device using symmetric key encryption, such that the first electronic device performs the steps of:
transferring to the second electronic device a first data message, the first data message including first encrypted data and first metadata, the first metadata including a first key space identifier, the first key space identifier defining a first cryptographic key hierarchy or a subset of the first cryptographic key hierarchy which includes a first cryptographic key used to generate the first encrypted data, and positional information of the first cryptographic key of the first cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy, the first metadata enabling the second electronic device to select a second cryptographic key from a plurality of secret cryptographic keys stored in the second electronic device, using the first key space identifier received from the first electronic device, to derive the first cryptographic key by way of the one-way function from the second cryptographic key and the positional information included in the metadata, and to decrypt the first encrypted data, using the first cryptographic key, for verifying the authorization associated with the electronic device.

14. The computer program product of claim 13, wherein the non-transient computer-readable medium has stored thereon further computer program code configured to control the circuit of the first electronic device, such that the first electronic device performs the steps of: transferring to the other electronic device a second data message, the second data message including second encrypted data and second metadata, the second metadata including a second key space identifier, the second key space identifier defining a second cryptographic key hierarchy or a subset of the second cryptographic key hierarchy which includes a third cryptographic key used to generate the second encrypted data, and positional information of the third cryptographic key of the second cryptographic key hierarchy, enabling the second electronic device to select a fourth cryptographic key from the plurality of secret cryptographic keys stored in the second electronic device, using the second key space identifier received from the electronic device, to derive the third cryptographic key by way of the one-way function from the fourth cryptographic key and the positional information received from the first electronic device in the second data message, to derive the first cryptographic key by way of the one-way function from the second cryptographic key, using the positional information received from the first electronic device in the second data message, to produce first authorization data by decrypting the first encrypted data, using the first cryptographic key, to produce second authorization data by decrypting the second encrypted data using the third cryptographic key, and to verify the authorization associated with the first electronic device, using the first authorization data and the second authorization data.

15. An electronic device for verifying authorization associated with another electronic device using symmetric key encryption, the electronic device comprising a circuit configured to perform the steps of:
   receiving from the other electronic device a first data message, the first data message including first encrypted data and first metadata, the first metadata including a first key space identifier, the first key space identifier defining a first cryptographic key hierarchy or a subset of the first cryptographic key hierarchy which includes a first cryptographic key used to generate the first encrypted data, and positional information of the first cryptographic key of the first cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy;
   selecting a second cryptographic key from a plurality of secret cryptographic keys stored in the electronic device, using the first key space identifier received from the other electronic device;
   deriving the first cryptographic key by way of the one-way function from the second cryptographic key and the positional information received from the other electronic device; and
   decrypting the first encrypted data, using the first cryptographic key, for verifying the authorization associated with the other electronic device.

16. The electronic device of claim 15, wherein the circuit is further configured to receive from the other electronic device a second data message, the second data message including second encrypted data and second metadata, the second metadata including a second key space identifier, the second key space identifier defining a second cryptographic key hierarchy or a subset of the second cryptographic key hierarchy which includes a third cryptographic key used to generate the second encrypted data, and positional information of the third cryptographic key of the second cryptographic key hierarchy; select a fourth cryptographic key from the plurality of secret cryptographic keys stored in the electronic device, using the second key space identifier received from the other electronic device; derive the third cryptographic key by way of the one-way function from the fourth cryptographic key and the positional information received from the other electronic device in the second data message; deriving the first cryptographic key by way of the one-way function from the second cryptographic key, using the positional information received from the other electronic device in the second data message; produce first authorization data by decrypting the first encrypted data, using the first cryptographic key;
   produce second authorization data by decrypting the second encrypted data using the third cryptographic key; and verify the authorization associated with the other electronic device, using the first authorization data and the second authorization data.

17. The electronic device of claim 16, wherein decrypting the first encrypted data produces access rights encrypted in the first encrypted data, decrypting the second encrypted data produces time-dependent data encrypted in the second encrypted data; and the circuit is configured to verify the authorization associated with the other electronic device using the access rights and the time-dependent data.

18. The electronic device of claim 16, wherein, in case of the positional information received in the second data message differing from the positional information received in the first data message, the first encrypted data cannot be successfully decrypted by the circuit using the first cryptographic key derived with the positional information received in the second data message, and the circuit does not positively verify the authorization associated with the other electronic device.

19. A computer program product comprising a non-transient computer-readable medium having stored thereon computer program code configured to control a circuit of a second electronic device, for verifying authorization associated with a first electronic device using symmetric key encryption, such that the second electronic device performs the steps of:
   receiving from the first electronic device a first data message, the first data message including first encrypted data and first metadata, the first meta data including a first key space identifier, the first key space identifier defining a first cryptographic key hierarchy or a subset of the first cryptographic key hierarchy which includes a first cryptographic key used to generate the first encrypted data, and positional information of the first cryptographic key of the first cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy;
   selecting a second cryptographic key from a plurality of secret cryptographic keys stored in the second electronic device, using the first key space identifier received from the first electronic device;

deriving the first cryptographic key by way of the one-way function from the second cryptographic key and the positional information received from the first electronic device; and decrypting the first encrypted data, using the first cryptographic key, for verifying the authorization associated with the first electronic device.

20. The computer program product of claim 19, wherein the non-transient computer-readable medium has stored thereon further computer program code configured to control the circuit of the second electronic device, such that the second electronic device performs the steps of: receiving from the first electronic device a second data message, the second data message including second encrypted data and second metadata, the second metadata including a second key space identifier, the second key space identifier defining a second cryptographic key hierarchy or a subset of the second cryptographic key hierarchy which includes a third cryptographic key used to generate the second encrypted data, and positional information of the third cryptographic key of the second cryptographic key hierarchy; selecting a fourth cryptographic key from the plurality of secret cryptographic keys stored in the second electronic device, using the second key space identifier received from the first electronic device; deriving the third cryptographic key by way of the one-way function from the fourth cryptographic key and the positional information received from the first electronic device in the second data message; deriving the first cryptographic key by way of the one-way function from the second cryptographic key, using the positional information received from the first electronic device in the second data message; producing first authorization data by decrypting the first encrypted data, using the first cryptographic key; producing second authorization data by decrypting the second encrypted data using the third cryptographic key; and verifying the authorization associated with the first electronic device, using the first authorization data and the second authorization data.

\* \* \* \* \*